United States Patent Office 3,198,741
Patented Aug. 3, 1965

3,198,741
THERMOPLASTIC RESINOUS MATERIALS
Zenon Kazenas, Euclid, Ohio, assignor to Switzer Brothers, Inc., Cleveland, Ohio, a corporation of Ohio
No Drawing. Filed May 26, 1961, Ser. No. 112,785
28 Claims. (Cl. 252—301.2)

This application is a continuation-in-part of my copending application Serial No. 689,770, filed October 14, 1957, now abandoned, which in turn was a continuation-in part of my copending application Serial No. 406,331, filed January 26, 1954, now U.S. Patent No. 2,809,954.

The present invention relates to a new thermoplastic resin and, more particularly, to a thermoplastic co-condensation product in which one of the components is a cyclic aminotriazine, derivatives thereof or the partial condensation products thereof with an aldehyde. The present invention also relates to new pigment materials and, more particularly, to new pigments made with such thermoplastic co-condensation product. In addition, the invention relates to new coating and casting compositions containing such pigments and to new methods for making such compositions.

It has now been found in accordance with the present invention that a thermoplastic resin may be prepared which is a co-condensation product of a cyclic s-aminotriazine, an aldehyde and an aralkyl monosulfonamide. The new resin has a higher softening point than the well-known sulfonamide-aldehyde resins and has some characteristics which are in no way similar to the completely condensed aminotriazine-aldehyde resins and other characteristics which are in no way similar to the thermoplastic sulfonamide-aldehyde resins. The new resin not only has a higher melting point than the sulfonamide-aldehyde resins, but it will release solvents more rapidly than such resins and does not exhibit cold flow at room temperatures as do the sulfonamide-aldehyde resins. On the other hand, the new resin, unlike the conventional aminotriazine-aldehyde resins, is soluble in certain solvents and is thermoplastic. The over-all character of the new resin makes it especially suitable for the manufacture of pigments. For example, the new resin can be highly colored and, even though thermoplastic, can be readily ground to a finely-divided condition at temperatures below about 100° C. Most thermoplastic resins will either soften at the temperatures encountered during grinding or will tend to ball up or agglomerate, even at temperatures below the softening point, probably due to cold flow under the pressure of the grinding elements. The new resin is brittle and friable below its softening point and is not horn-like and tough, as are most thermosetting resins. The new resin is insoluble in many common vehicles and can therefore be suspended in such vehicles without coalescence or agglomeration.

The new thermoplastic resin pigments of the present invention possess greatly improved light-fastness and color brightness, which permits substantially thinner films to be used to obtain optimum effects, particularly with fluorescent dystuffs, than heretofore possible with pigments available to the prior art. In addition, these pigments can be ground to extremely small particle sizes without serious loss of tinctural strength, enabling them to be used in many new applications such as in printing inks, for example, letterpress inks, gravure inks, and the like. These advantages are obtained to a more noticeable degree in daylight fluorescent pigments made in accordance with the present invention.

Although daylight fluorescent pigments have gained wide acceptance in recent years, the use of these pigments has been somewhat restricted by the lack of satisfactory light-fastness and color strength and also by the difficulties in preparing pigments of uniform fine particle size.

The original efforts at producing daylight fluorescent color effects simply involved attempts to dissolve dyestuffs in lacquers or shellacs. However, the use of such dye solutions or spirit varnishes proved to be completely impractical since the coatings formed had practically no light-fastness and very little, if any, daylight fluorescence.

Later, it was found that more or less satisfactory daylight fluorescent color effects could be obtained with pigments in which daylight fluorescent dyestuffs were solvated in thermosetting resins ground to relatively coarse powder. However, these pigments were limited in light-fastness and color strength and could not be ground fine enough for many uses because of the tough, horn-like nature of the thermoset resin, loss of tinctural strength, bulking characteristics, and poor working properties when such pigments were dispersed in ink and like coating composition vehicles.

Attempts were made to use thermoplastic resins which could be ground such as, for example, acrylonitrile polymers and copolymers, polyamides, and the like, rather than thermosetting resins in the production of daylight fluorescent pigments. However, when attempts were made to grind these thermoplastic resin pigments, it was found that the pigments were often fibrous or elastic, or they softened at the temperatures encountered during grinding, or they tended to ball up and agglomerate even at temperatures below the softening point of the resins, or were too impact resistant. In addition, many of these thermoplastic resins were partially dissolved or swollen by solvents commonly employed in the paint and ink industry. Another serious shortcoming of many of these pigments was their inferior light-fastness particularly when daylight fluorescent dyes of the naphthalimide class were employed.

In view of the shortcomings of the thermosetting and, particularly, the thermoplastic resin pigments employed or attempted heretofore, it was totally unexpected and completely surprising to find that the pigments of the present invention not only possess superior light-fastness and color strength, but, also, that they are brittle and friable below their softening point and can be easily ground at temperatures below about 100° C. to produce the very fine particle sizes previously desired but not attainable.

In accordance with the invention, pigments are produced by dispersing a color material, such as a dye, in a resin which is a co-condensation product of an aralkyl mono-sulfonamide, a cyclic aminotriazine, and an aldehyde such as formaldehyde. As disclosed herein, this may be done by any of three illustrative procedures. In accordance with two of these procedures, the colored resin is recovered in massive amorphous form and then ground to the desired particle size. In accordance with the third of these procedures, the resin particles are first formed by grinding the uncolored, solid, massive resin, and these particles are dyed by immersion in an aqueous dye bath. In all three cases, the final pigment particles are formed by the easy grinding of a substantially non-porous, massive resin, as distinguished, for example, from merely breaking up agglomerates of fine particles produced by precipitation of the resin from a liquid solution, or the difficult grinding of a thermosetting resin which has been cured in the solid state.

By virtue of the brittle, friable character of the amorphous resins of the present invention and the lack of porosity of the resin mass at the time of grinding, the resins inherently break down with a conchoidal-like fracture that is characteristic of brittle, ground, amorphous materials, such as glass, and the resultant non-porous particles, having a minimum (or complete absence) of reentrant surfaces, exhibit many outstanding qualities in coating compositions and particularly in printing inks. The ground resins resist subsequent agglomeration before, during, and after dispersion in a film-forming vehicle and resist settling in many such vehicles to a remarkable degree. They have exceptionally low oil absorption characteristics and superior solvent release properties. They may be initially produced, stored and handled as relatively coarse sand-like particles up to the point of being mixed into a film-forming vehicle and are readily broken down to the desired ultimate particle size, without balling or agglomeration, while being ground into the vehicle on a conventional 3-roll mill or the like. And the coating compositions produced with such pigments, particularly printing inks, have exceptional working properties.

In so far as the new colored pigment is concerned, it has been found that the light-fastness of the new pigment is better than that of other colored pigments containing the same soluble dyestuffs available to the prior art. This characteristic renders the new resin particularly suitable for use with yellow and red soluble fluorescent dyes such as, for example, the rhodamines (xanthenes) and the naphthalimides.

In this connection, a film of a known sulfonamide-aldehyde thermoplastic resin in which brilliant yellow 6G base had been incorporated showed a decided darkening after five hours in an Atlas weather-ometer. On the other hand, a film of completely condensed melamine-aldehyde resin containing the same dye showed an undesirable degree of darkening after five hours in the weather-ometer, although the darkening was not as bad as in the case of the thermoplastic resin. However, a similar film of the new thermoplastic resin, according to the present invention, with the same percentage of the same dye showed substantially less darkening effect after five hours in the weather-ometer.

The thermoplastic resin of the present invention may be prepared from an aralkyl monosulfonamide having two reactive hydrogens, i.e., two reactive amide hydrogens, a cyclic aminotriazine or a derivative thereof having at least two primary amino groups, and formaldehyde or paraformaldehyde. If desired, either or both of the first-mentioned components may be separately reacted with formaldehyde to form a thermoplastic sulfonamide-aldehyde resin or a B-stage (partially condensed) aminotriazine-aldehyde resin, respectively, before being co-condensed.

Advantageously, the aralkyl monosulfonamides used in the resins of the present invention are those in which the alkyl portion of the aralkyl group is a short chain radical, for example, in the range of about 1 to 3 carbon atoms, with the alkyl group being attached directly to the sulfur atom of the sulfonamido group. The aryl portion is preferably a benzene nucleus, but also may be a naphthalene group. Benzyl sulfonamide is one of the preferred sulfonamides for use in preparing the thermoplastic resins of the present invention.

The cyclic aminotriazine compound may comprise a compound having at least two amino groups as represented by the following formula:

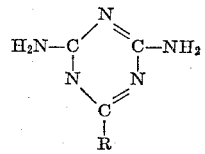

wherein R is hydrogen, alkyl (preferably less than nine carbon atoms), aryl, aralkyl, amino, and the like.

The following are typical aminotriazine compounds within the above formula:

2,4-diamino-1,3,5-triazine
2-methyl-4,6-diamino-1,3,5-triazine
2-(3-hydroxybutyl)-4,6-diamino-1,3,5-triazine
2-hepthyl-4,6-diamino-1,3,5-triazine
2-phenyl-4,6-diamino-1,3,5-triazine
2-benzyl-4,6-diamino-1,3,5-triazine
2,4,6-triamino-1,3,5-triazine (melamine)

In place of melamine as the aminotriazine compound, one can use methyl melamine or other alkyl derivatives of melamine (i.e., N-alkyl melamines), such as the mono- or dialkyl derivatives where the alkyl group may be methyl, ethyl, propyl, butyl, and the like, up to about eight carbon atoms.

Also, the B-stage methylol aminotriazine (aminotriazine-aldehyde) resin can be modified by forming the alkyl ether of the methylol aminotriazine. For example, this can be done by taking an A-stage methylol aminotriazine, i.e., the tri, tetra- or pentamethylol aminotriazine, and then converting to the B-stage resin in the presence of an alkanol such as methanol, ethanol, propanol, butanol, and similar alkanols containing up to about eight carbon atoms. When using methanol, the resin would be the mono- or dimethyl ether of tri, tetra- or pentamethylol aminotriazine, in partially condensed form. Also, alkanol derivatives of the aminotriazine in which the alkyl group contains more than about three carbon atoms may be formed during the course of the co-condensation reaction by introducing the aminotriazine in a solution of an alcohol such as butanol. It will be noted that the aminotriazine reacts as an amide rather than as an amine.

The relative quantities of the materials to be co-condensed are critical only to the extent that sufficient aldehyde should be used to produce a completely condensed product; if too large a quantity of the aminotriazine is used, the final product will be a thermosetting product, which is not desired; and if too small a quantity of the aminotriazine is used, the softening point of the product will differ only slightly from the softening point of the sulfonamide-formaldehyde resin and may not have insolubility in the desired solvents. Also, the amount of the sulfonamide is dependent upon the number of primary amino groups in the aminotriazine. For example, it is preferred to use about three times (on a molar basis) as much of the sulfonamide as the aminotriazine when the aminotriazine contains two amino groups, and about five times as much sulfonamide when the aminotriazine contains three amino groups. In other words the aminotriazine (or B-stage aldehyde-aminotriazine resin) is preferably from about 20 to 50 mol percent of the amount of monosulfonamide (or aldehyde-monosulfonamide resin), although the former may be as great as about 70 mol percent and as little as about 17 mol percent of the latter.

Generally, when preparing the alkanol modified resin, it is necessary to use additional quantities of formaldehyde over and above that required for the alkanol modification so as to provide for subsequent co-condensation with the sulfonamide-formaldehyde resin. The B-stage aminotriazine-formaldehyde resin, i.e., the methylol aminotriazine, must have at least two methylol groups and preferably three such groups in order to successfully carry out the subsequent co-condensation with the sulfonamide resin.

As will be noted from the following examples, the resins of the present invention may be prepared using as reactants either formaldehyde or its polymer, paraformaldehyde, which polymer has the general formula

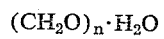

where $n$ equals $6+$. This monomer and its polymer should be distinguished from polyaldehydes such as glyoxal containing a plurality of aldehyde groups in a stable molecule.

The present invention will now be described in greater detail by reference to the following examples. The quantity of paraformaldehyde given in the examples is based on 100% formaldehyde.

Example 1

360 grams of benzyl sulfonamide-formaldehyde resin were melted at 60°–70° C. and then heated to 125° C. At this temperature 78.4 grams of B-stage unmodified melamine-formaldehyde resin were added and dissolved therein. The solution became clear at about 135° C., and heating was continued up to 170° C. and held there for about ten minutes. Upon cooling, the co-condensed resin began to solidify at about 115° C. The completely condensed product (94.5% yield) was a clear water-white resin which, below about 100° C. was brittle, friable, and easily ground in a micropulverizer or by wet ball milling into a finely divided powder.

Example 2

180 grams of benzyl sulfonamide-formaldehyde resin were melted at about 60°–70° C. and then heated up to about 130° C. 20 grams of melamine were added, and after about ten minutes the solution became clear; then 14.3 grams of paraformaldehyde were added at 120° C. The entire mixture was then heated up from 120° C. to between 170° C. and 175° C. while stirring over a thirty minute period. The mixture was then clear. Upon cooling, the resulting completely condensed resin began to solidify at about 105° C. Below 100° C. the resin, which was clear and water-white, became brittle and friable, as in Example 1.

Example 3

167 grams of benzyl sulfonamide, 29.4 grams of paraformaldehyde, and 39.2 grams of the B-stage unmodified melamine-formaldehyde resin were heated together to a temperature of about 170° C. for about fifteen minutes. Upon cooling, the resulting completely condensed resin began to solidify at about 115° C. The resin was clear and water-white, and below about 100° C. it was brittle and friable, as in Example 1.

Example 4

168 grams of benzyl sulfonamide and 29.4 grams of paraformaldehyde were heated together to a temperature of about 150° C., while stirring, and maintained at that temperature for about twenty minutes. To this resin, at 115–120° C., were added 39 grams of the B-stage unmodified melamine-formaldehyde resin, and the mixture was heated up to 170° C. for fifteen minutes. The resulting completely condensed resin had a softening point of 115° C. and physical characteristics substantially the same as in Examples 1, 2, and 3.

Example 5

154.1 grams of benzyl sulfonamide were heated to 120° C. 20.1 grams of melamine were then added and stirred at 120° C. for fifteen minutes. 41.3 grams of paraformaldehyde were added in about seven equal portions over a period of about twenty minutes while the temperature was kept at about 115–120° C. After all of the paraformaldehyde was added, the temperature was raised to 170° C. for about fifteen minutes. The product resin had a softening point of about 112° C. The resin had the physical characteristics of the resins in the foregoing examples.

Example 6

To 155 grams of formalin (38% concentration) was added sufficient KOH (20% solution) to adjust the pH value of the formalin to about 9. Then 168 grams of benzyl sulfonamide were added. The mixture was heated to 100° C. and maintained at that temperature until all water had been evaporated. The temperature was then raised to 150° C. and held there for 10–15 minutes. About 180 grams of the sulfonamide-aldehyde resin was formed. To this resin, at 115° C., was added 39 grams of the B-stage melamine-aldehyde resin, and the mixture was then heated up to 170° C. with stirring and held at that temperature for 15–20 minutes. The resulting completely condensed product, as in the prior examples, softened at about 115° C. and was brittle and friable below about 100° C.

Example 7

196.7 grams of benzyl sulfonamide were heated to 115° C. 36.4 grams of paraformaldehyde (95%) were then added slowly with mechanical stirring until thoroughly mixed. 71.7 grams of 2-phenyl-4,6-diamino-1,3,5-triazine and 31.85 grams of additional paraformaldehyde were added with stirring. When the materials were thoroughly mixed, the temperature was raised to 175–180° C. over a period of about 40 minutes and held at that temperature for an additional 10 minutes, during which time excess formaldehyde in the reaction mixture was distilled off. The resulting completely condensed product (87.4% yield) had the physical characteristics of the resins in the foregoing examples.

Example 8

The procedure of this example was the same as Example 7 except that 84.3 grams of 2-benzyl-4,6-diamino-1,3,5-triazine were substituted for the 2-phenyl-4,6-diamino-1,3,5-triazine. The physical characteristics of the resulting completely condensed product were substantially the same as the resins of the foregoing examples.

Example 9

The procedure of this example was the same as Example 7 except that 62.9 grams of 2-(beta-cyanoethyl)-4,6-diamino-1,3,5-triazine were substituted for the 2-phenyl-4,6-diamino-1,3,5-triazine. The resulting completely condensed product had the physical characteristics of the resins of the foregonig examples.

Example 10

The procedure of this example was the same as Example 7 except that 78.9 grams of diallyl melamine were substituted for the 2-phenyl-4,6-diamino-1,3,5-triazine. The resulting completely condensed product had the physical characteristics of the resins of the foregoing examples.

Any of the foregoing clear resins can be colored to form the pigments of the invention by introduction of the coloring material at a suitable stage up to and including production of the resin in finely-divided form. In preparing fluorescent pigments from xanthene, naphthalimide, and/or coumarin fluorescent dyes, it is highly desirable that the dye or dyes be completely dissolved in the resin. Additionally, the resin may be colored by other coloring materials, including other resin-soluable dyes, organic or inorganic pigments, flatting and opacifying agents, or the like, by dispersing any such coloring materials in the resin.

Examples 11 through 17 illustrate formulations for a number of different dyes which may be combined with the clear resins of Examples 1 to 10 by adding the dye when the mixture has reached a temperature of between 150° C. and 160° C., while heating up to 180° C., or by remelting the finished resin and adding the dye to the melt. The amount of dye given in each example is the amount used for each 100 grams of clear resin.

Example 11

When 1.97 grams of brilliant yellow 6G base (4-amino-1,8-naphthal-2′,4′-dimethyl phenylimide) and 0.22 gram of rhodamine 6 GDN Extra (Color Index No. 752) are incorporated in the resin, the final product has an orange-yellow color which is strongly daylight fluorescent when applied to surfaces by various printing methods. The dyes employed in this case are a combination of a fluorescent naphthalimide dye and a fluorescent xanthene dye.

Example 12

If 0.97 gram of rhodamine B Extra (Color Index No. 749) and 0.97 gram of rhodamine 6 GDN Extra are incorporated in the resin, the resulting colored resin pigment is a bluish-red which is also strongly daylight fluorescent when applied to a surface as an ink. The dyes employed in this case are a combination of two xanthene dyes.

*Example 13*

If 3.0 grams of brilliant yellow 6G base (fluorescent naphthalimide dye) are incorporated in the resin, the resulting pigment is a lemon yellow which is also highly daylight fluorescent.

*Example 14*

If 0.33 gram of rhodamine B Extra and 0.5 gram of rhodamine 6 GDN Extra (two fluorescent xanthene dyes) and 1.0 gram of brilliant yellow 6G base are incorporated in the resin, the resulting pigment is a fiery-orange and is highly daylight fluorescent.

In addition to the particular fluorescent xanthene dyes used in the foregoing examples, one may use other fluorescent xanthene dyes such as, for example, xylene red (Color Index No. 748), rhodamine 5G (Color Index No. 746), rhodamine G (Color Index No. 750), or rhodamine 2B (Color Index No. 751).

In addition to the particular fluorescent naphthalimide dye used in the foregoing examples, one may use other fluorescent naphthalimide dyes, such as, for example:

(4-N-butyl-amino)-1,8-naphthal n-butyl imide
4-amino-1,8-naphthal p-xenyl imide

Depending upon the particular pigment color desired, one may employ any of the fluorescent naphthalimide and fluorescent xanthene dyes, individually, or in combination with each other, or in combination with other coloring materials of the character recited above.

The proportion of the fluorescent dye is not critical, but is dependent upon the particular color desired and the particular dye or combination of dyes employed. Amounts as high as 4% or more have been used successfully.

While the superior light-fastness of pigments made by incorporating coloring materials in the resins herein disclosed is particularly pronounced when the coloring material comprises one or more of the fluorescent naphthalimide and fluorescent xanthene dyes, the invention is not so limited, and other fluorescent or non-fluorescent dyes or mixtures thereof may be used to advantage as shown in the following Examples 15, 16, and 17.

*Example 15*

If 0.97 gram of malachite green (Color Index No. 657) is incorporated in the resin, the product has the characteristic green color of that dye.

*Example 16*

The incorporation of 1.0 gram of 4-methyl-7-diethyl-amino coumarin in the resin produced a colorless resin which could be easily ground to a fine powder and which gave a bright blue color when exposed to ultraviolet light.

*Example 17*

360 grams of benzyl sulfonamide resin were melted at 60°–70° C. and then heated to 115° C., at which point a mixture of 37.35 grams of cadmium primrose (a non-fluorescent yellow cadmium sulfide pigment sold by Harshaw Chemical Co.) dispersed in 37.35 grams of water was added with stirring and the heating continued. When the temperature reached 125° C., 78.4 grams of B-stage unmodified melamine-formaldehyde resin were added and dissolved therein. The mixture was then heated until the temperature reached 150° C., at which point 4.15 grams of rhodamine B Extra were added. Heating was continued until the temperature reached about 170° C., and then was held at this temperature for about 10 minutes. The resulting pigment was a bright red and was highly daylight fluorescent.

Other non-fluorescent coloring materials also may be employed in combination with the fluorescent coloring materials in the same manner that the mixture of rhodamine B Extra and cadmium primrose was employed in Example 17. For example, 5% of rutile titanium dioxide, 10% of lithopone or 9% of chrome yellow may be dispersed in one of the fluorescent thermoplastic resin pigments of the present invention to produce different color effects.

If desired, a colorless ultraviolet absorbing agent such as a nearly pure substituted benzophenone may be added in combination with the fluorescent dyes of Examples 11–14 and 17. The incorporation of 1% of a suitable nearly pure substituted benzophenone enhances the stability of these pigments to daylight. The addition of ultraviolet absorbing agents to daylight fluorescent pigments is the subject of Switzer et al. Patent No. 2,653,-109.

In Examples 11 to 17, pigments were prepared by the preferred method of introducing the dyestuff in the molten resin. If desired, the undyed resin may be prepared in its final, solidified, finely ground state by any of the conventional grinding procedures, following which the finely ground resin may be immersed in a dye bath to incorporate one or more dyes and produce a colored pigment. Alternatively, the solidified resin and the dye or dyes may be dissolved in a ketone or an ester solvent, the solvent evaporated, and the resulting colored resin then ground to pigment form. These optional procedures are illustrated in the following Examples 18 and 19:

*Example 18*

A dye bath was prepared as follows:

40 cc. water
1.0 gram iso-octyl phenyl ether of polyethylene glycol, known as "Triton X-100"
10.0 cc. formic acid (90% solution)
.05 gram rhodamine B Extra
.05 gram rhodamine 6 GDN Extra The above materials were dissolved to form a 0.2% dye bath, and 5 grams of the powdered resin of Example 1 were added. The dye concentration was 2% based on the weight of the resin. The dye bath and resin were warmed to hasten incorporation of the dye in the resin, to a temperature not above 46° C. for three minutes, and the dyed resin was then filtered from the bath and washed with cold water until the water was substantially colorless. By comparing the color of the dyed resin and the color of a resin containing 1% of the same dyes which had been incorporated during manufacture as in Example 12, it was estimated that the resin powder contained 1% of the dyes.

*Example 19*

100 grams of the resin of Example 1, before being ground, were dissolved in 300 grams of acetone along with 0.5 gram of rhodamine B Extra and 0.5 gram of rhodamine 6 GDN Extra. After mixing thoroughly, the acetone was evaporated to leave the dyed resin in solid massive form, and the thus dyed resin was ground to pigment fineness to produce a pigment comparable to that produced in Example 18.

The pigments prepared in the manner described in the foregoing examples are insoluble in water and aliphatic hydrocarbon solvents, are practically insoluble in aromatic hydrocarbon solvents, and are soluble in ketones and solvent esters.

Based on the physical characteristics mentioned herein, the pigments of the present invention may be used in a wide variety of liquid vehicle binders to form protective and decorative paints, enamels, or lacquers, silk screen inks, letterpress inks, self-sustaining resinous films, molded or extruded articles, and the like. In general, the suitable vehicle binders for obtaining the maximum benefits from the invention are those which are capable of being transformed to solid form by oxidation, solvent evaporation, or polmerization or a combination of such processes, and in which the pigments of the invention are substantially insoluble so that the pigments may be dispersed in the vehicle as undissolved, finely-divided particles. However, the pigments of the invention may also be used in vehicles in which they are dissolved so that the pigment becomes, in effect, a part of the vehicle itself. Obviously, where fluorescent pigments are employed, the vehicle should be substantially transparent, though not necessarily colorless, in order to obtain the full benefit of the fluorescent properties of the pigments.

The many types of vehicle binders which may be advantageously colored with the pigments of the present invention to produce novel pigmented compositions are illustrated by the following additional examples. In all of these examples, the parts and percentages given are by weight.

The two following examples illustrate, respectively, an alkyd base silk screen ink and a lacquer type silk screen ink, both containing the new pigment suspended in a vehicle:

*Example 20*

| | Parts |
|---|---|
| Long oil alkyd (soya type, 50% solids) | 40.6 |
| Aluminum stearate gel | 8.6 |
| Driers (metal naphthenates) | 0.3 |
| Mineral spirits | 6.5 |
| Pigment as per Example 11 using resin of Example 1 | 44.0 |

The above ink, when applied by the silk screen process, dries principally by oxidation to a hard film and produces a bright yellow color having a slightly orange tint.

In the foregoing example, the alkyd resin may be replaced in the same formulation with a linseed oil varnish, or a phthalic anhydride-castor oil alkyd varnish of 60% solids, or a phthalic anhydride-linseed oil alkyd varnish of 60% solids.

*Example 21*

| Vehicle: | Parts |
|---|---|
| Styrene-butadiene resin | 40 |
| Aromatic petroleum solvent having a KB value of 70 to 90 | 60 |

To 30 parts of the above vehicle, add 4 parts of methyl dihydroabietate and 28 parts of any of the pigments of Examples 10 to 18 to produce the desired color. If desired, the resin in the above vehicle may be replaced by a mixture containing about 30 parts of cyclized rubber and 10 parts of a low molecular weight polystyrene, in which case the methyl dihydroabietate may be omitted.

The compositions of Example 21 will dry essentially by solvent evaporation to a hard colored film, and drying may be accelerated by the application of heat, if desired. Although formulated primarily as a silk screen ink, the composition may suitably be used as a coating composition for brush or spray application by adjustment of the amount of petroleum solvent to produce the desired consistency.

The following example illustrates a letterpress printing ink containing the new pigment suspended in a vehicle:

*Example 22*

| | Parts |
|---|---|
| No. 3 heat bodied linseed oil | 10 |
| Pigment as per Example 15 using resin of Example 1 | 15 |
| Kerosene | 6 |
| Lead and manganese linoleates | 3 |
| Calcium sulfonate of mahogany acids | 1 |

This material is dispersed on a conventional three-roll ink mill. The priting ink of this example will air dry, but, if desired, drying may be accelerated with heat in accordance with common practice in the use of printing inks.

The following example illustrates a paint containing a new pigment of the invention in combination with a conventional pigment:

*Example 23*

| | Parts |
|---|---|
| Long oil alkyd (castor oil type, 54% solids) | 50 |
| Driers (metal naphthenates) | 0.7 |
| Mineral spirits | 10 |
| Cadmium primrose | 4.5 |
| Pigment as per Example 12 using resin of Example 1 | 50 |

This material is dispersed on a conventional three-roll ink mill. The above paint, when applied by brush, dries principally by oxidation to a hard film and produces a bright red color.

The alkyd resin may be replaced by other varnishes which upon drying give a relatively transparent film. Also, the cadmium primrose may be replaced by another non-fluorescent pigment such as, for example, Hansa yellow.

The following example illustrates a paint especially formulated to produce a flexible film suitable for coating fabrics, rubber articles, and the like:

*Example 24*

The ingredients of the following components A and B are separately mixed, as by ball milling.

| Component A: | Parts |
|---|---|
| Chloro-sulfonated polyethylene containing about 27% chlorine and 1.5% sulfur and polymerized to solid form | 40 |
| Xylol | 160 |
| Component B: | |
| Light calcined magnesium oxide | 7.4 |
| Pigment as per Example 13 using resin of Example 1 | 30.0 |
| Xylol | 85.6 |
| Mercaptobenzothiazole | .8 |
| Diphenyl guanidine | .2 |
| Hydrogenated rosin | 1.0 |

40 parts of Component A and 24.4 parts of Component B are then thoroughly mixed to produce a sprayable coating composition that sets in part by solvent evaporation and in part by vulcanization or condensation and has a pot life of about 4 hours at room temperature. Minor dilutions to adjust the viscosity for spraying may be made with xylol or toluene. The cure may be effected at room temperature or may be accelerated by heating at temperatures up to about 110° C. for 20 to 30 minutes.

The following example is illustrative of a plastisol suitable for casting or molding into finished solid objects:

*Example 25*

| | Parts |
|---|---|
| 95% vinyl chloride–5% vinyl acetate copolymer | 50 |
| Dioctyl phthalate | 12.5 |
| Dioctyl sebacate | 12.5 |
| Pigment as per Example 14 using resin of Example 1 | 20 |
| Epoxy resin stabilizer, 175 to 210 epoxide equivalents (Shell "Epon 828") | 3 |

When this plastisol is cast or molded into bodies of appreciable thickness, it is heat cured at about 350°–360° F. for long enough to reach this temperature throughout the mass which may require from 10 to 20 minutes. When formed into thin films or thin walled bodies, curing for from 3 to 5 minutes at that temperature will suffice.

The composition of this last example may be diluted by adding up to about 15 parts of V.M. & P. naphtha or 15 parts of a 50% mixture of V.M. & P. naphtha and toluol to 85 parts of the plastisol to produce an organosol which may be more easily spread into thin films for making self-sustaining, colored, transparent sheet materials or thin walled bodies.

Examples 20 to 25 have been given primarily to show that the pigments of the present invention, when colored with a fluorescent naphthalimide or a fluorescent xanthene dye, are not limited in their utility to being suspended in a particular type of vehicle binder, either as regards the chemical character of the vehicle or the physical properties which render the vehicle suitable for different uses. The light-fastness, color strength, and fluorescent properties of the resultant products compared to the same vehicle compositions containing prior art pigments are imparted primarily by the new pigment resin employed in accordance with the invention as a solvent for the dye. Such improved properties are achieved to the most pronounced degree when the vehicle binder has the new pigment or pigments dispersed therein in an undissolved, finely-divided state, as illustrated by Examples 20 to 25. As should be evident from the variety of different vehicle binders disclosed, this improvement is independent of the chemical composition of the vehicle binder and of the process by which it is converted to a solid state, so long as the vehicle binder is not a solvent for the pigment and is substantially transparent so as to permit the fluorescent properties of pigment particles within the body of the solidified binding medium to be effective.

The following example illustrates a coating composition in which the pigment of the invention is dissolved in the vehicle binder:

*Example 26*

For coating wood, the following formulation may be used:

| | Parts |
|---|---|
| Pigment as per Example 12 using resin of Example 1 | 14 |
| Low viscosity cellulose butyrate | 22 |
| Dioctyl phthalate plasticizer | 12 |
| Methyl ethyl ketone | 25 |
| Ethyl acetate | 25 |
| Toluene | 10 |

If a sprayable composition is desired, the above formulation may be thinned out with an additional 25 grams of ethyl acetate and 25 grams of toluene. The resulting coating is transparent and has a reddish color. A white or other light colored primer coat may be applied to the wood before applying the resin coating so as to provide a diffusely reflecting background. Such a primer coat should be used when coating a metal or the like.

Although the present invention has been described with reference to the foregoing examples, it will be understood that various modifications will occur to those skilled in the art, and it is intended that such modifications as come within the scope of the appended claims be covered thereby.

What is claimed is:

1. A process of producing a colored pigment comprising producing a thermoplastic, resinous, condensation product, grinding said condensation product to finely divided form, and incorporating a coloring material in the condensation product at a stage up to and including its production in finely divided form; said resinous condensation product being prepared by completely co-condensing, at a temperature not exceeding 180° C., a fluid reaction mass consisting essentially of a first component (A) selected from the class consisting of (a) a mixture of at least one aldehyde entirely selected from the class consisting of formaldehyde and paraformaldehyde and at least one aralkyl monosulfonamide having two reactive amide hydrogens, where the alkyl portion of the aralkyl group of said monosulfonamide containing about 1 to 3 carbon atoms and being attached directly to the sulfur atom of the sulfonamido group, and (b) a thermoplastic condensation product of the constituents of mixture (a), and a second component (B) selected from the class consisting of (c) a mixture of at least one aldehyde entirely selected from the class consisting of formaldehyde and paraformaldehyde and at least one aminotriazine having at least two amino groups, and (d) a thermofusible partial condensation product of the constituents of mixture (c), the amount of said second component (B) being an amount, not exceeding about 70 mol percent of said first component (A) sufficient to render said completely condensed, thermoplastic, resinous condensation product substantially insoluble in aromatic hydrocarbon solvents but insufficient to render it thermosetting.

2. A process according to claim 1 in which the coloring material comprises at least one dye selected from the class consisting of fluorescent naphthalimide dyes and fluorescent xanthene dyes, dissolved in the condensation product.

3. A process according to claim 1 in which the coloring material comprises at least one dye selected from the class consisting of fluorescent naphthalimide dyes and fluorescent xanthene dyes, incorporated by dissolving it in the condensation reaction mixture during the condensation step.

4. A process according to claim 1 in which the coloring material comprises at least one dye selected from the class consisting of fluorescent naphthalimide dyes and fluorescent xanthene dyes, incorporated by dissolving said dye in said completely condensed thermoplastic resinous condensation product while the condensation product is in a molten condition after its formation.

5. A process according to claim 1 in which the coloring material comprises at least one dye selected from the class consisting of fluorescent naphthalimide dyes and fluorescent xanthene dyes, incorporated by dissolving the completely condensed, thermoplastic, resinous condensation product, after its formation, in a volatile solvent therefor, dissolving said dye in the resin solution, and evaporating said volatile solvent.

6. A process according to claim 1 in which the aminotriazine in the resinous condensation product is melamine.

7. A process according to claim 1 in which the aminotriazine in the resinous condensation product is 2-phenyl-4,6-diamino-1,3,5-triazine.

8. A process of producing a colored pigment comprising producing a thermoplastic, resinous condensation product, grinding said consendation product to finely divided form, dissolving a fluorescent coloring material in the condensation product at a stage up to and including its production in finely divided form, and dispersing a non-fluorescent coloring material in the condensation product at a stage up to and including its production in finely divided form; said resinous condensation product being prepared by completely co-condensing, at a temperature not exceeding 180° C., a fluid reaction mass consisting essentially of a first component (A) selected from the class consisting of (a) a mixture of at least one aldehyde entirely selected from the class consisting of formaldehyde and paraformaldehyde and at least one aralkyl monosulfonamide having two reactive amide hydrogens, the alkyl portion of the aralkyl group of said monosulfonamide containing about 1 to 3 carbon atoms and being attached directly to the sulfur atom of the sulfonamido group, and (b) a thermoplastic condensation product of the constituents of mixture (a), and a second component (B) selected from the class consisting of (c) a mixture of at lease one aldehyde entirely selected from the class consisting of formaldehyde and paraformaldehyde and at least one aminotriazine having at least two amino groups, and (d) a thermofusible partial condensation product of the constituents of mixture (c), the amount of said second component (B) being an amount, not exceeding about 70 mol percent of the first component (A), sufficient to render said completely condensed, thermoplastic, resinous condensation product substantially insoluble in aromatic hydrocarbon solvents but insufficient to render it thermosetting.

9. A process according to claim 8 in which the non-fluorescent coloring material is a yellow pigment.

10. A process of producing a colored pigment comprising producing a thermoplastic, resinous condensation product, grinding the same to finely divided form, preparing an aqueous dye bath containing at least one dye selected from the class consisting of fluorescent naphthalimide dyes and fluorescent xanthene dyes, immersing the ground condensation product in said dye both at a temperature not substantially above 46° C., and recovering the dyed resin particles from said dye bath; said resinous condensation product being prepared by completely co-condensing, at a temperature not exceeding 180° C., a fluid reaction mass consisting essentially of a first component (A) selected from the class consisting of (a) a mixture of at least one aldehyde entirely selected from the class consisting of formaldehyde and paraformaldehyde and at least one aralkyl monosulfonamide having two reactive amide hydrogens, the alkyl portion of the aralkyl group of said monosulfonamide containing about 1 to 3 carbon atoms and being attached directly to the sulfur atom of the sulfonamido group, and (b) a thermoplastic condensation product of the constituents of mixture (a), and a second component (B) selected from the class consisting of (c) a mixture of at least one aldehyde entirely selected from the class consisting of formaldehyde and paraformaldehyde and at least one aminotriazine having at least two amino groups, and (d) a thermofusible partial condensation product of the constituents of mixture (c), the amount of said second component (B) being an amount, not exceeding about 70 mol percent of said first component (A), sufficient to render said completely condensed, thermoplastic, resinous condensation product substantially insoluble in aromatic hydrocarbon solvents but insufficient to render it thermosetting.

11. A process of producing a colored pigment comprising producing a thermoplastic, resinous condensation product, grinding said condensation product to finely divided form, and incorporating a coloring material in the condensation product at a stage up to and including its production in finely divided form; said resinous condensation product being prepared by completely co-condensing, at a temperature not exceeding 180° C., a fluid reaction mass consisting essentially of a first component (A) selected from the class consisting of (a) a mixture of at least one aldehyde entirely selected from the class consisting of formaldehyde and paraformaldehyde, and benzyl sulfonamide, (b) a thermoplastic condensation product of the constituents of mixture (a), and a second component (B) selected from the class consisting of (c) a mixture of at least one aldehyde entirely selected from the class consisting of formaldehyde and paraformaldehyde, a melamine, and (d) a thermofusible partial condensation product of the constituents of mixture (c), the amount of said melamine constituent being from about 17 to about 50 mol percent of said sulfonamide, and the amount of said aldehyde component being sufficient to react with substantially all of the amino groups of the sulfonamide and melamine, so as to render said resinous condensation product completely condensed and thermoplastic but substantially insoluble in aromatic hydrocarbon solvents.

12. A process according to claim 11 in which the coloring material comprises at least one fluorescent dye incorporated by dissolving the dye in the condensation reaction mixture during the condensation step.

13. A process according to claim 11 in which the coloring material comprises at least one fluorescent dye incorporated by dissolving the dye in said completely condensed, thermoplastic, resinous condensation product while the condensation product is in a molten condition after its formation.

14. A pigment comprising a finely-divided, completely condensed, thermoplastic resin and a coloring material dispersed therein, said resin consisting essentially of the condensation product of at least one aldehyde entirely selected from the class consisting of formaldehyde and paraformaldehyde, at least one aralkyl monosulfonamide having two reactive amide hydrogens, the alkyl portion of the aralkyl group of said monosulfonamide containing about 1 to 3 carbon atoms and being attached directly to the sulfur atom of the sulfonamido group, and at least one aminotriazine having at least two amino groups, the amount of said aminotriazine being an amount, not exceeding about 70 mol percent of said monosulfonamide sufficient to render said resin substantially insoluble in aromatic hydrocarbon solvents but insufficient to render it thermosetting.

15. A pigment according to claim 14 in which the aminotriazine in the thermoplastic resin is melamine.

16. A pigment according to claim 14 in which the aminotriazine in the thermoplastic resin is 2-phenyl-4,6-diamino-1,3,5-triazine.

17. A pigment according to claim 14 in which the coloring material is a fluorescent coloring material.

18. A pigment according to claim 14 in which the coloring material comprises at least one dye selected from the class consisting of fluorescent naphthalimide dyes and fluorescent xanthene dyes.

19. A pigment comprising a finely divided, completely condensed, thermoplastic resin and a coloring material dispersed therein; said resin consisting essentially of the condensation product of at least one aldehyde entirely selected from the class consisting of formaldehyde and paraformaldehyde, benzyl sulfonamide and melamine, the amount of said melamine being between about 17 and 50 mol percent of said monosulfonamide and the total amount of said aldehyde constituent being at least in excess of the total amount of said sulfonamide and melamine constituents on a molar basis.

20. A pigment according to claim 19 in which the coloring material is a fluorescent coloring material.

21. A pigment according to claim 19 in which the coloring material comprises at least one dye selected from the class consisting of fluorescent naphthalimide dyes and fluorescent xanthene dyes.

22. A pigment comprising a finely divided, completely condensed, thermoplastic resin, a fluorescent coloring material dissolved therein, and a non-fluorescent coloring material dispersed therein; said resin consisting essentially of the condensation product of at least one aldehyde entirely selected from the class consisting of formaldehyde and paraformaldehyde, at least one aralkyl monosulfonamide having two reactive amide hydrogens, the alkyl portion of the aralkyl group of said monosulfonamide containing about 1 to 3 carbon atoms and being attached directly to the sulfur atom of the sulfonamido group, and at least one aminotriazine having at least two amino groups, the amount of said aminotriazine being an amount sufficient to render said resin substantially insoluble in aromatic hydrocarbon solvents not exceeding about 70 mol percent of said monosulfonamide, and the total amount of said aldehyde constituent being at least in excess of the total amount of said sulfonamide and aminotriazine constituents on a molar basis.

23. A pigment according to claim 22 in which the non-fluorescent coloring material is a yellow pigment.

24. A pigmented liquid composition suitable for forming coating films and self-sustaining bodies, comprising a pigment dispersed as an undissolved, finely divided solid in a substantially transparent, liquid, vehicle binder which is not a solvent for the pigment and is convertible to a solid state, said pigment comprising a finely divided, completely condensed, thermoplastic resin and a coloring material dispersed therein; said resin consisting essentially of the condensation product of at least one aldehyde entirely selected from the class consisting of formaldehyde and paraformaldehyde, at least one aralkyl monosulfonamide having two reactive amide hydrogens, the alkyl portion of the aralkyl group of said monosulfonamide containing about 1 to 3 carbon atoms and being attached directly to the sulfur atom of the sulfonamido group, and at least one aminotriazine having at least two amino groups, the amount of said aminotriazine being an amount not exceeding about 70 mol percent of said monosulfonamide sufficient to render said resin substantially insoluble in aromatic hydrocarbon solvents but insufficient to render it thermosetting.

25. A pigmented liquid composition according to claim 24 in which the aminotriazine component of said thermoplastic resin is melamine.

26. A pigmented liquid composition according to claim 24 in which the aminotriazine component of said thermoplastic resin is 2-phenyl-4,6-diamino-1,3,5-triazine.

27. A pigmented liquid composition suitable for forming coating films and self-sustaining bodies, comprising a pigment dispersed as an undissolved, finely divided solid in a substantially transparent, liquid vehicle binder which is not a solvent for the pigment and is convertible to a solid state, said pigment comprising a finely divided, completely condensed, thermoplastic resin, a fluorescent coloring material dissolved therein and a non-fluorescent coloring material dispersed therein; said resin consisting essentially of the condensation product of at least one aldehyde entirely selected from the class consisting of formaldehyde and paraformaldehyde, at least one aralkyl monosulfonamide having two reactive amide hydrogens, the alkyl portion of the aralkyl group of said monosulfonamide containing about 1 to 3 carbon atoms and being attached directly to the sulfur atom of the sulfonamido group, and at least one aminotriazine having at least two amino groups, the amount of said aminotriazine being sufficient to render said resin substantially insoluble in aromatic hydrocarbon solvents but not exceeding about 70 mol percent of said monosulfonamide, and the total amount of said aldehyde constituent being at least in excess of the total amount of said sulfonamide and aminotriazine constituents on a molar basis.

28. A pigmented liquid composition according to claim 27 in which the non-fluorescent coloring material is a yellow pigment.

References Cited by the Examiner
UNITED STATES PATENTS

| | | | |
|---|---|---|---|
| 2,498,593 | 2/50 | Switzer | 252—301.2 |
| 2,809,954 | 10/57 | Kazenas | 260—45.2 |
| 2,938,873 | 5/60 | Kazenas | 252—301.2 |

MAURICE A. BRINDISI, *Primary Examiner.*

MILTON STEARMAN, *Examiner.*